Figure 1:
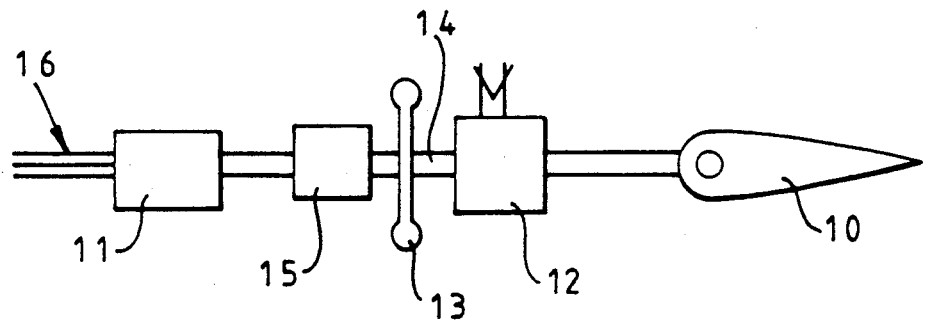

United States Patent [19]
Glaze

[11] Patent Number: 5,104,062
[45] Date of Patent: Apr. 14, 1992

[54] SYSTEM FOR OPERATING AIRCRAFT FLIGHT CONTROLS

[75] Inventor: Stanley G. Glaze, Kingswinford, Great Britain

[73] Assignee: Luca Industries plc, England

[21] Appl. No.: 562,703

[22] Filed: Aug. 6, 1990

[30] Foreign Application Priority Data

Aug. 12, 1989 [GB] United Kingdom ............. 891843

[51] Int. Cl.⁵ .......................................... B64C 13/24
[52] U.S. Cl. ................... 244/75 R; 74/572;
310/74; 192/8 R; 315/150
[58] Field of Search ............... 244/75 R, 76 R, 76 C,
244/78, 228, 220, 221, 227; 310/74; 318/150,
161, 434, 459; 388/928.1, 930, 932; 417/319, 15,
44, 45, 129 A, 139; 192/41 R, 7, 8 R, 0.02 R;
74/572; 180/65.8

[56] References Cited

U.S. PATENT DOCUMENTS

| | | | |
|---|---|---|---|
| 2,873,833 | 2/1959 | Hogan | 192/41 R |
| 2,931,928 | 4/1960 | Fehn, Sr. | 318/161 |
| 2,941,638 | 6/1960 | Hoovey | 192/0.02 R |
| 3,285,376 | 11/1966 | Starrantino | 244/228 |
| 4,155,436 | 5/1979 | Wilkinson et al. | 192/0.02 R |
| 4,282,947 | 8/1981 | Kemper | 74/572 |
| 4,605,107 | 8/1986 | Hallidy et al. | 192/0.02 R |
| 4,633,484 | 1/1987 | Hudson | 244/75 R |
| 4,723,099 | 2/1988 | Herzig | 318/150 |

FOREIGN PATENT DOCUMENTS 0271744 11/1987 European Pat. Off. .......... 244/75 R

Primary Examiner—Galen Barefoot
Attorney, Agent, or Firm—Andrus, Sceales, Starke & Sawall

[57] ABSTRACT

An aircraft flight control is operated by an electric motor by way of a flywheel and a stepless variable speed ratio device. A device, for example an over-running clutch, is provided so that movement of the flight control by external forces does not cause the motor to generate a reverse current in its electrical supply.

8 Claims, 1 Drawing Sheet

SYSTEM FOR OPERATING AIRCRAFT FLIGHT CONTROLS

It has been proposed, for example in EP-A-0271744, to position an aircraft control surface by means of an electric motor which drives a hydraulic pump unit, a hydraulic output from the pump being used to energize a linear actuator for the control surface. In the above reference a flywheel is included in the drive to the pump, so that energy supplied to the system when the control surface is moved by an external aerodynamic force can be stored in the flywheel and subsequently used to move the control surface against an opposing aerodynamic force.

It is a disadvantage of such a system that storage of energy in the flywheel is accompanied by an increase in speed of the electric motor, causing the latter to return power to the electrical supply. Power flow returned is not available for subsequent use, and may adversely affect regulation of the electrical power supply.

It is an object of the invention to provide a system for electrically powered operation of an aircraft flight control surface, in which substantially all power returned from the flight control to a flywheel in the system is stored in the flywheel for subsequent use.

According to the invention there is provided a system for operating an aircraft flight control surface, comprising an electric motor, a flywheel rotatable with a shaft driven by said motor, means for coupling said shaft to said flight control surface so that the rate of movement of said flight control surface in either direction is a function of the speed of said flywheel, and means for preventing energy in said flywheel from being transmitted to an electrical supply to said motor.

Figure 2:
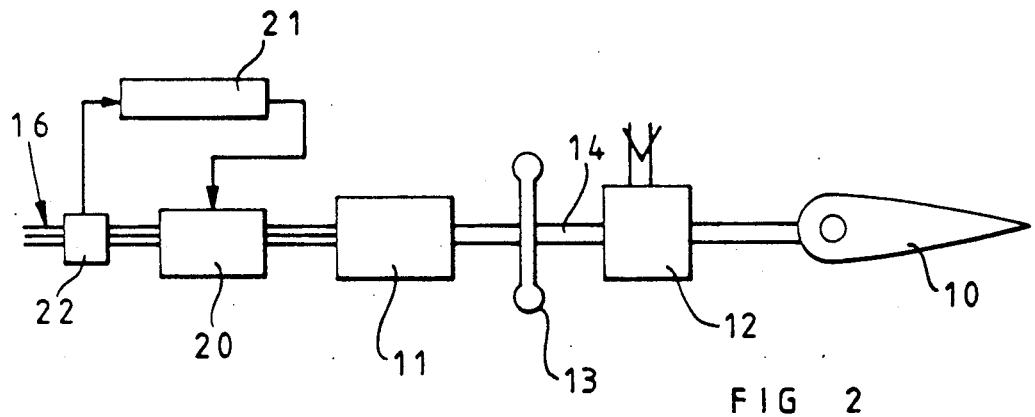
Figure 3:
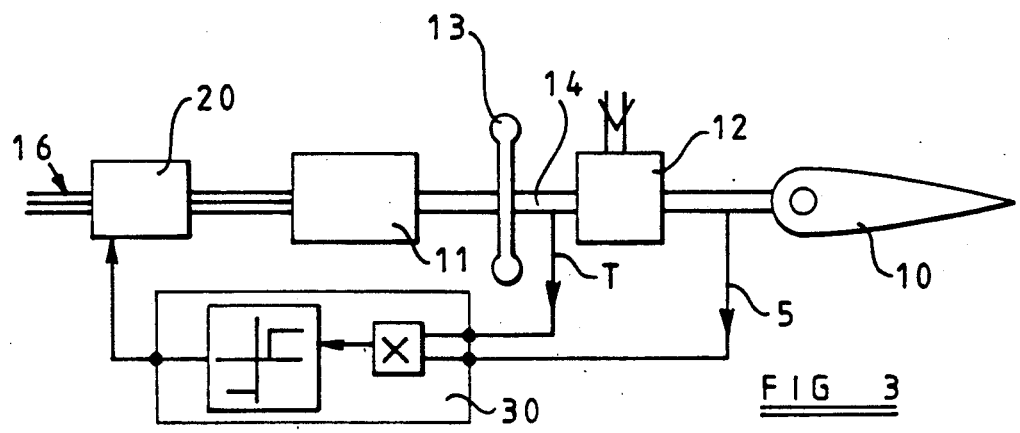

Embodiments of the invention will now be described by way of example only and with reference to the accompanying drawings in which:

FIG. 1 shows a system in which the motor is connected to the flywheel through an over-running clutch, FIG. 2 shows a system in which the motor may be disconnected from its electrical supply in response to a reversal of power therein, and FIGS. 3 shows a system in which the motor may be disconnected from its electrical supply in response to a predetermined level of mechanical power supplied to the flight control.

As shown in FIG. 1 an aircraft flight control surface 10 is driven by an electric motor 11 through a stepless variable speed ratio device 12. The device 12 may be any of the well-known mechanical speed-varying devices or may be a variable-pump/motor device. A flywheel 13 is provided on the output shaft 14 of the motor 11 and an over-running clutch 15 is provided between the motor 11 and the flywheel 13. The motor 11 is energisable by a three-phase electrical supply 16. The clutch 15 is overrunning in one direction only, and is such that the motor 11 can drive the control surface 10 against an aerodynamic load, but drive from the surface 10 cannot be transmitted back to the motor 11. Thus, movement of the surface 10 under the influence of external forces will impart energy to flywheel 13, and speed up the latter. This energy will not, however, be transmitted to the motor 11 to apply power to the electrical supply 16 thereof. Substantially all energy supplied from the control surface 10 to the flywheel 13 is therefore subsequently available to drive the surface 10 against an opposing load.

FIG. 2 shows a modification of the arrangement of FIG. 1, corresponding parts having identical reference numerals. It will be seen that the system of FIG. 2 does not include an over-running clutch. Instead a switch device 20 is responsive to a signal from a control circuit 21 to isolate the supply 16 from the motor 11. The circuit 21 is in turn responsive to a signal from a detector 22 when the direction of electrical power supply to the motor 20 is reversed, that is when the motor 20 starts to be driven by the surface 10 under the influence of an external force on the latter. In these circumstances substantially all energy from the surface 10 is stored in the flywheel 13, no energy being transmitted from the flywheel 13 to the motor electrical supply 16.

FIG. 3 shows a modification of the system of FIG. 2, corresponding parts having identical reference numerals. In this case the switch 20 is responsive to signals from a control circuit 30 which is in turn responsive to the sign and magnitude of a signal S corresponding to the sensed speed of the surface 10 and also to a signal T corresponding to the torque T on the input shaft 14 to the device 12. The circuit 30 provides a signal to the power switch 20 to give the product of torque and speed. When that product is negative, indicating a power supply from the surface 10 to the flywheel 13, the switch 20 is operated to isolate the motor 11 from its electrical supply. It will be understood that if the device 12 comprises a variable displacement hydraulic device, values of hydraulic flow and pressure difference may be substituted for the signals S and T respectively. Alternatively, any other convenient means for determining the direction of power flow may be used.

In alternative embodiments a reversible, variable-hydraulic pump may be substituted for the device 12 and the control surface 10 may be driven by a ram which is powered by the pump output, as shown in EP-A-0271744. In such an arrangement control of the direction and speed of the surface 10 is effected by a swash plate of the pump. Such an arrangement is shown in the embodiment of FIG. 3 described above, wherein the pressure difference across the actuator ram will be substituted for the torque T as an input to the circuit 30.

In any of the described embodiments the flywheel need not be a separate element, but may be provided by the inertia of the rotor of the motor 11, or by other parts which rotate with the shaft 14.

I claim:

1. A system for operating an aircraft flight control surface, comprising an electric motor, an output shaft from said motor, a flywheel drivingly secured to said shaft, a transmission device for coupling said shaft to said flight control surface so that the rate of movement of said flight control surface in either direction is a function of the speed of said shaft, a switch in an electrical supply to said motor and a control device for operating said switch to isolate said motor from said supply when a drive is applied by said control surface to said motor, whereby energy in said flywheel is prevented from being transmitted to said electrical supply.

2. A system as claimed in claim 1 in which said transmission device comprises a stepless variable speed ratio device.

3. A system as claimed in claim 1 in which said control device comprises a circuit for detecting when the direction of an electrical power supply to said motor is reversed.

4. A system as claimed in claim 1 in which said control device is response to direction of mechanical power supply between said control surface and said flywheel.

5. A system as claimed in claim 4 in which said control device is responsive to the direction and magnitude of both torque and speed in a driving connection between said control surface and said flywheel.

6. A system as claimed in claim 4 in which said transmission device comprises a variable stroke hydraulic pump and a hydraulic actuator powered by the output from said pump, said control device being responsive to a pressure difference across said actuator.

7. A system for operating an aircraft flight control surface, comprising an electric motor, an output shaft from said motor, a flywheel drivingly secured to said shaft, a transmission device for coupling said shaft to said flight control surface so that the rate of movement of said flight control surface in either direction is a function of the speed of said shaft, and an overrunning clutch between said flywheel and said motor, said clutch being arranged to overrun when a drive is applied by said control surface to said shaft, whereby energy in said flywheel is prevented from being transmitted to an electrical supply for said motor.

8. A system as claimed in claim 7 in which said transmission device comprises a stepless variable speed ratio device.

* * * * *